H. E. IVES.
ARTIFICIAL LIGHTING MEANS.
APPLICATION FILED FEB. 18, 1913.

1,090,785.

Patented Mar. 17, 1914.

WITNESSES:

INVENTOR
Herbert E. Ives
BY
Augustus B. Stoughton.
ATTORNEY

UNITED STATES PATENT OFFICE.

HERBERT E. IVES, OF MOUNT AIRY, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

ARTIFICIAL LIGHTING MEANS.

1,090,785.  Specification of Letters Patent.  Patented Mar. 17, 1914.

Application filed February 18, 1913. Serial No. 749,145.

*To all whom it may concern:*

Be it known that I, HERBERT E. IVES, a citizen of the United States, and a resident of Mount Airy, in the county of Philadelphia and State of Pennsylvania, have invented certain new and useful Improvements in Artificial Lighting Means, of which the following is a specification.

The principal object of the present invention is to provide a color filter or absorbing screen which operates to modify artificial light passing through it so as to produce a resultant illumination equivalent to daylight, whereby many operations can be successfully carried on by artificial light which heretofore required daylight; for example, the matching of colors and certain surgical and other operations well understood in the art.

The invention will be claimed at the end hereof, but will be first described in connection with the accompanying drawings forming part hereof and in which I have illustrated certain embodiments, selected by me from other embodiments, for the sake of description.

Figure 1:
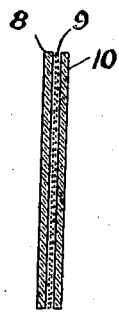
Figure 2:
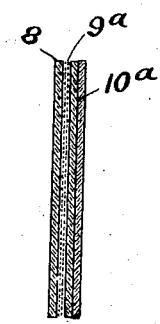
Figure 3:
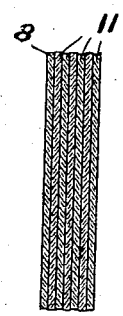

In those drawings, Figure 1 is a transverse sectional view of a color filter or absorbing screen embodying features of the invention. Figs. 2 and 3 are similar views embodying modifications of the invention, and Fig. 4, is a diagrammatic view, hereinafter referred to for the sake of description.

Figure 4:
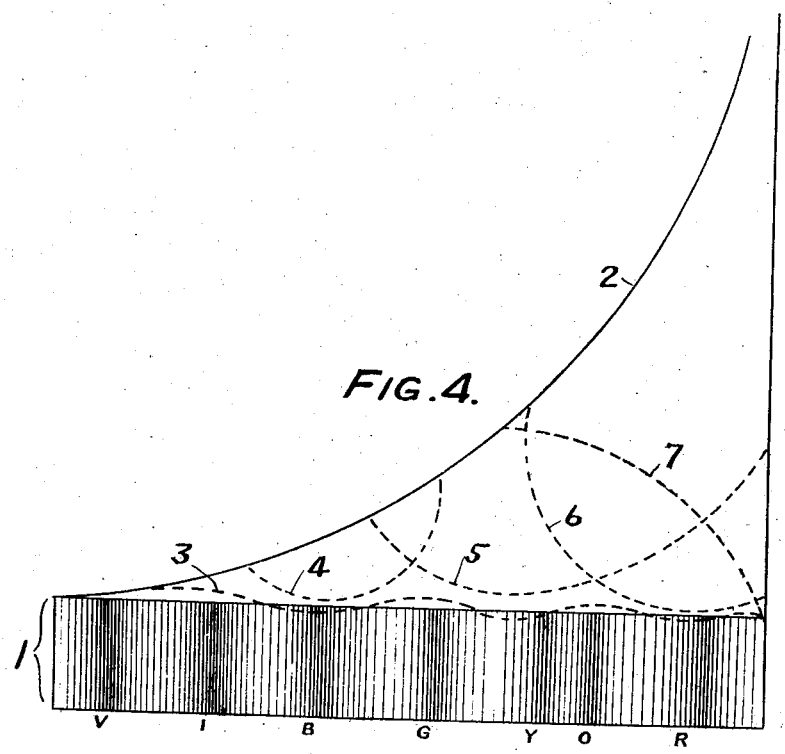

Referring to the drawings and more particularly to Fig. 4, the rectangle 1 diagrammatically represents the spectrum of daylight; the letters indicate the colors of that spectrum. The height of the rectangle represents the intensity of the various colors as present in the spectrum of daylight. The curved line 2 indicates the relative intensity of the various colors in the spectrum of the artificial light which it is desired to modify. For the sake of illustration and explanation the spectrum of the artificial light source and the spectrum of the daylight source are drawn as of equal intensities at the extreme violet end. Artificial light sources as generically represented by the area included under the curve 2 are usually different from daylight in possessing an excess of the longer spectrum wave lengths, that is yellow, orange and red. An absorbing screen or color filter in order to alter an artificial light spectrum to that of daylight must absorb these excessive radiations. If the relative intensities of the different colors of the spectrum are plotted upon such a scale that the intensities of daylight and the artificial light sources are the same at the blue extremity of the spectrum, then the transmission of the absorbing screen must be as the reciprocal of the ratio at each color of the intensity of the artificial light spectrum to the daylight spectrum.

The color filter or absorbing screen embodying features of the present invention is adapted by absorption to produce the above described result, or perhaps more accurately, a very close approximation to it. In Fig. 4 the approximation is indicated by the dotted line 3 and the dotted lines 4, 5, 6, and 7, indicate the absorptions diagrammatically and separately. For example, the dotted line 7 indicates that red rays are absorbed from the artificial light reducing it from the curve 2 to the line 7. Similarly the dotted lines 4, 5, and 6 represent other absorptions supplementary to the absorptions indicated by the line 7. The dotted line 3 indicates the net result of the various absorptions as has been stated.

A color filter or absorbing screen embodying features of the invention consists of sections or elements. In all of the drawings the element 8 is of the color well known as signal green and may comprise glass of that color. Signal green is the trade-name for glass, which glass is colored usually with copper although occasionally by nickel or iron. The depth of color of the element 8, or of the signal green glass, may be initially ascertained by experiment and having been once ascertained by experiment or otherwise can be reproduced by matching the color of the element 8 with an aqueous solution of copper sulfate and thereafter the solution of copper sulfate or a like solution thereof will serve as a future comparison. The element 8 performs the function of absorbing the deep red rays from the artificial source as is illustrated diagrammatically by the line 7 in Fig. 3. Associated with the element 8 are an additional element or elements of pink or purple color, which performs the light absorbing functions diagrammatically illustrated in Fig. 4, by lines 4, 5, and 6. By purple or pink is meant that color or colors having the effect of absorbing the intermediate colors of the visible spectrum. The element 9 of purple or pink color is shown in Fig. 1 to comprise a film as of gelatin, collodion or equivalent containing purple and pink dyes or pigments, preferably of fast color. The element 10 in Fig. 1 is of clear glass and when present serves to protect the element 9.

The construction and mode of operation in Figs. 2 and 3 is as has been described in connection with Fig. 1, except that in Fig. 2 the glass element 10ª (or more, if desired,) may be colored so that in connection with the element 9ª the requisite purple or pink is produced and in Fig. 3, the pink or purple color is produced by a number of glass elements 11, which are of such individual colors as are appropriate for producing in combination the pink or purple color.

From the foregoing description it will be evident that the invention is not confined in its application to any particular type or kind of source of artificial light. It is applicable to gas, gas incandescent and electric lights of several kinds requiring, of course, modification in the proportion of the relative color constituents. For example, an open gas flame gives rise to a larger proportion of red rays than do some other sources of artificial light, and in the case of such an open flame it is necessary to employ a larger proportion of the signal green color than is required, for example, with a so-called Welsbach light.

It will be obvious to those skilled in the art to which the invention relates that modifications may be made in details of construction and arrangement and hence I do not intend to limit my invention in respect to those matters nor in any way further than the state of the prior art may require, but

Having thus described the nature and objects of my invention what I claim as new and desire to secure by Letters Patent is:

1. A color filter or absorbing screen for the purposes described comprising the combination of superposed signal green and purple colors, substantially as described.

2. A color filter or absorbing screen for the purpose described, comprising a signal-green, glass element with other superposed elements of purple color.

3. A color filter or absorbing screen for the purposes described comprising the combination of a signal green glass element with another superposed element containing dyes or pigments of purple color, substantially as described.

In testimony whereof I have hereunto signed my name.

HERBERT E. IVES.

Witnesses:
S. E. PATTERSON,
A. E. FRENCH.